F. S. DENISON.
ELECTRIC MOTOR.
APPLICATION FILED NOV. 2, 1914.

1,167,890.

Patented Jan. 11, 1916.
3 SHEETS—SHEET 1.

WITNESSES

INVENTOR
FREDERICK S. DENISON
BY Paul & Paul
ATTORNEYS

F. S. DENISON.
ELECTRIC MOTOR.
APPLICATION FILED NOV. 2, 1914.
1,167,890.
Patented Jan. 11, 1916.
3 SHEETS—SHEET 2.
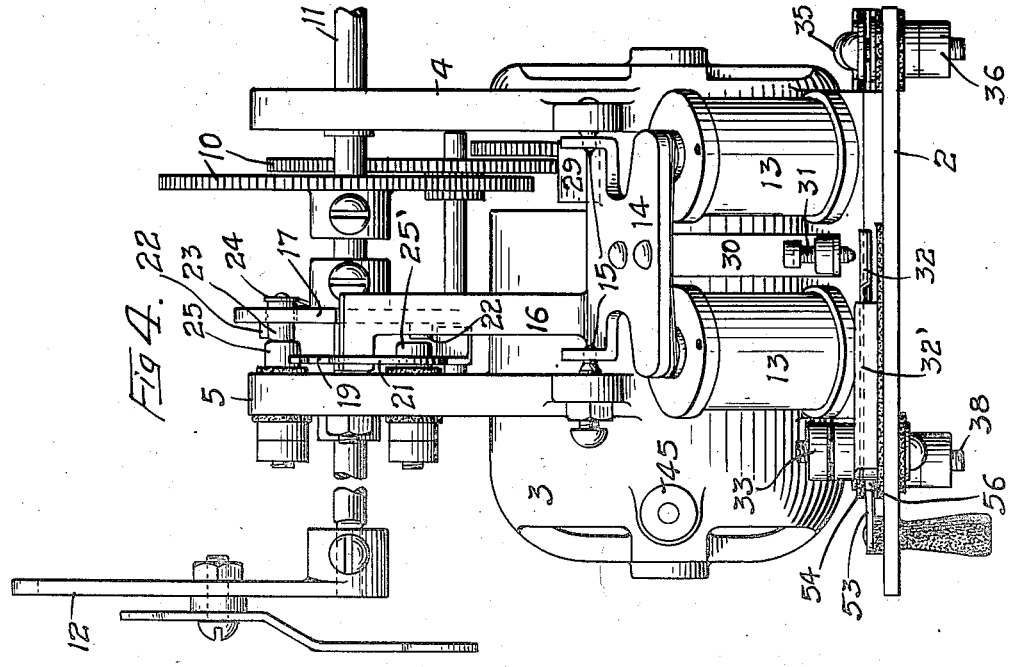
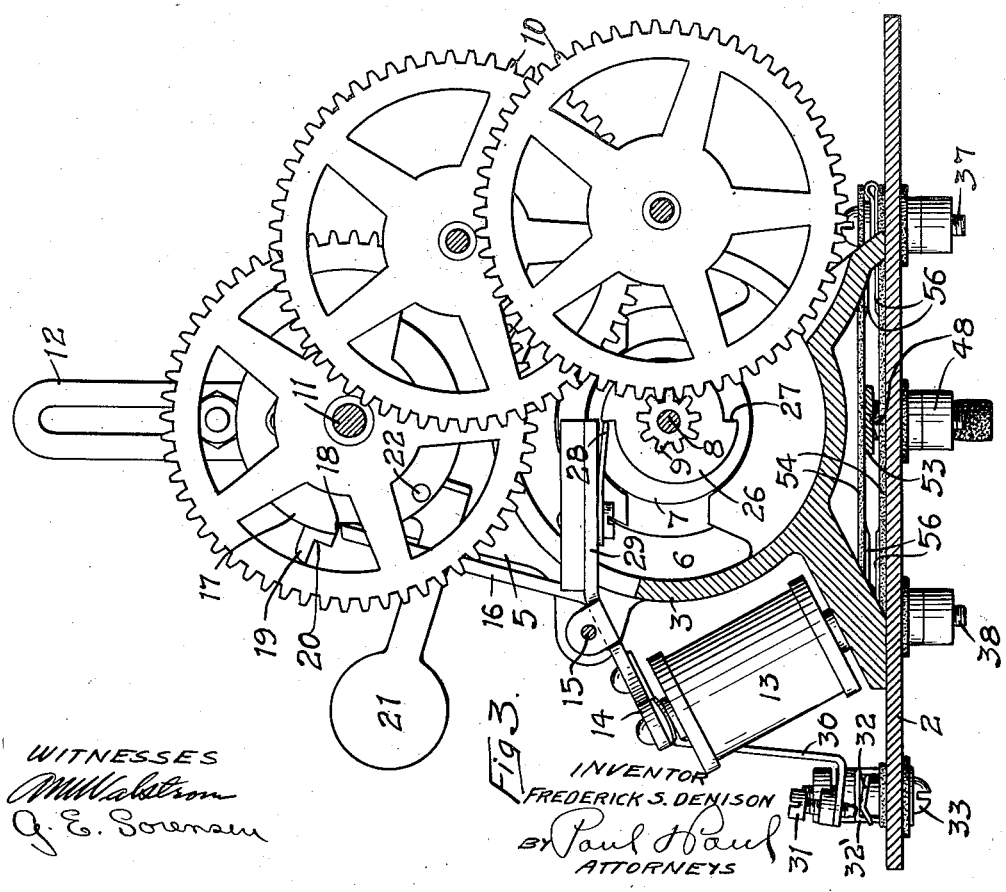
WITNESSES
INVENTOR
FREDERICK S. DENISON
BY Paul & Paul
ATTORNEYS

F. S. DENISON.
ELECTRIC MOTOR.
APPLICATION FILED NOV. 2, 1914.

1,167,890.

Patented Jan. 11, 1916.
3 SHEETS—SHEET 3.

WITNESSES

INVENTOR
FREDERICK S. DENISON
BY Paul & Paul
ATTORNEYS

UNITED STATES PATENT OFFICE.

FREDERICK S. DENISON, OF MINNEAPOLIS, MINNESOTA, ASSIGNOR TO MINNEAPOLIS HEAT REGULATOR CO., OF MINNEAPOLIS, MINNESOTA, A CORPORATION.

ELECTRIC MOTOR.

1,167,890. Specification of Letters Patent. Patented Jan. 11, 1916.

Application filed November 2, 1914. Serial No. 869,897.

*To all whom it may concern:*

Be it known that I, FREDERICK S. DENISON, a citizen of the United States, resident of Minneapolis, county of Hennepin, State of Minnesota, have invented certain new and useful Improvements in Electric Motors, of which the following is a specification.

My invention relates to that type of electric motors adapted for use with a thermostat for controlling the movement of dampers or valves.

The primary object of my invention is to provide a motor that is capable of being operated by a direct current from a battery or an alternating current through a transformer.

A further object is to provide a means for locking the armature and the circuit closing device or the electric motor circuit to prevent vibration of the armature when the alternating current is used.

A further object is to provide an improved contact for the circuit closing means of the electric motor to insure an uninterrupted circuit while the machine is in operation.

A further object is to provide a motor of simple, economical construction and one which will be positive and reliable in its operation.

Other objects of the invention will appear from the following detailed description.

The invention consists generally in various constructions and combinations, all as hereinafter described and particularly pointed out in the claims.

Figure 2:
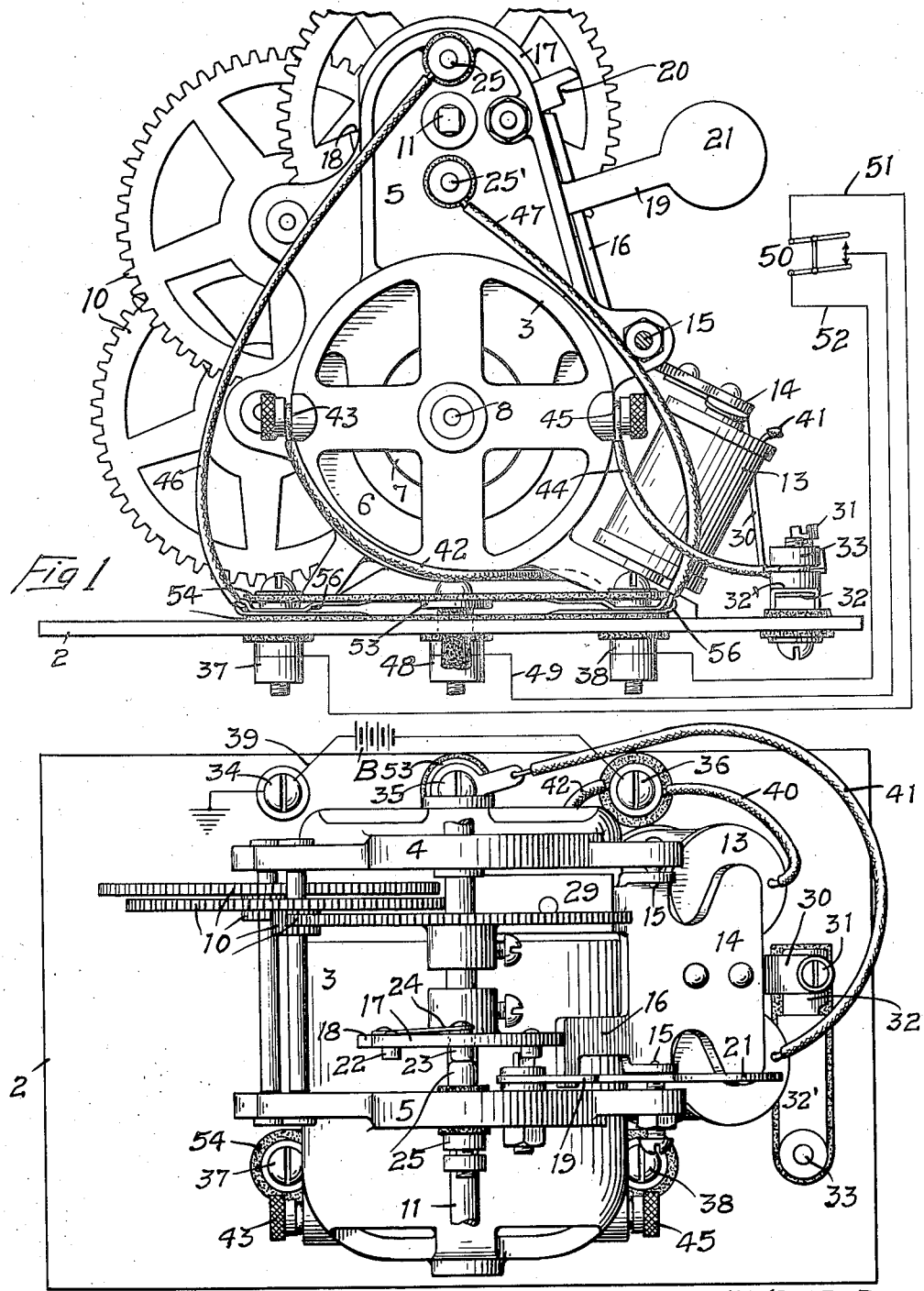
Figure 5:
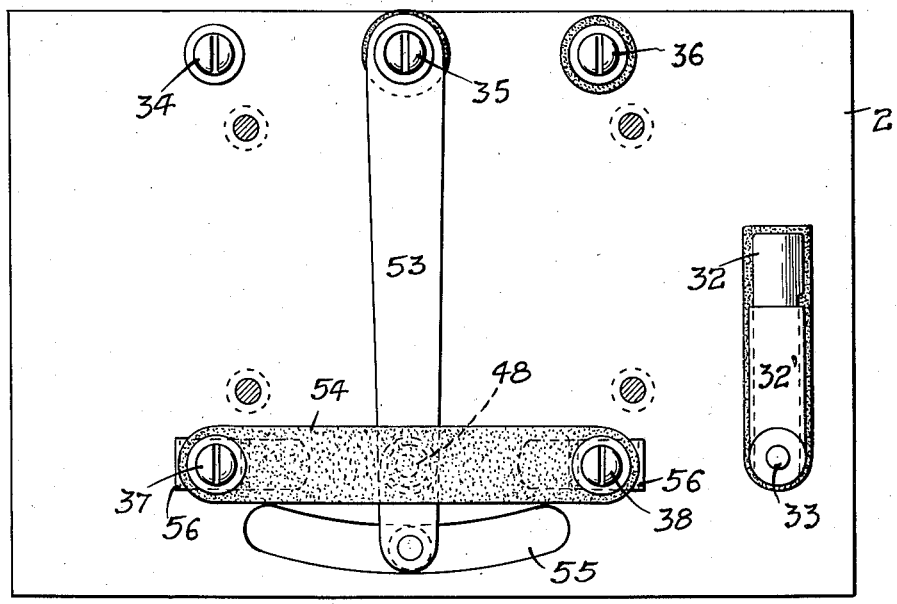
Figures 6, 7:
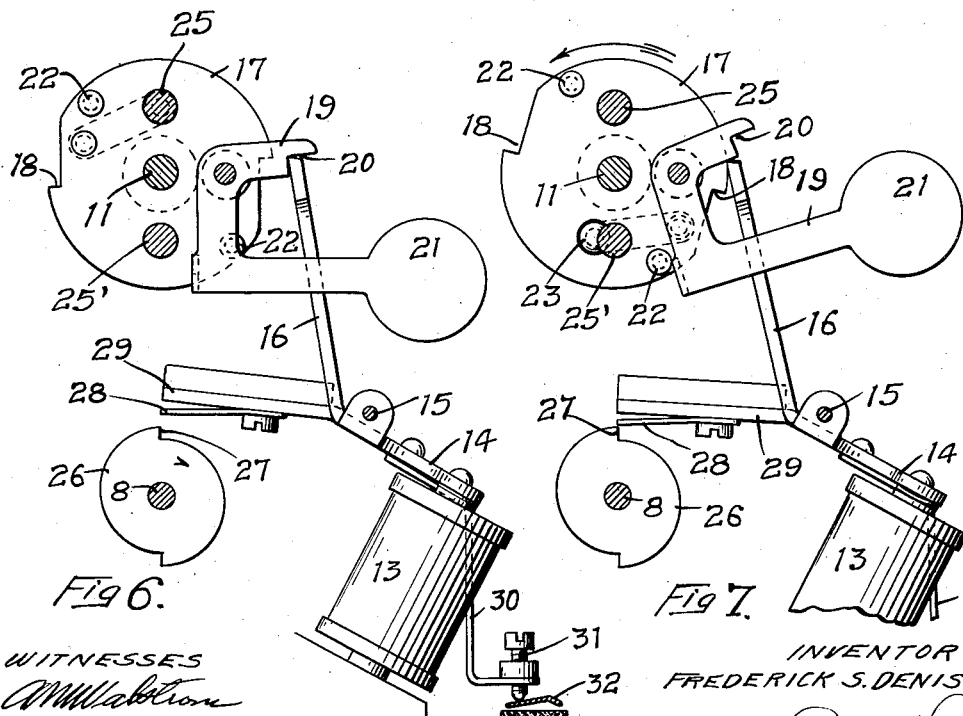

In the accompanying drawings forming part of this specification, Figure 1 is a front elevation of a motor embodying my invention, Fig. 2 is a plan view of the same, Fig. 3 is a vertical sectional view, illustrating the normal position of the armature and the means for checking the momentum of the electric motor armature, Fig. 4 is a side elevation of the machine, Fig. 5 is a plan view of the base, with the motor mechanism removed, Fig. 6 is a detail sectional view, illustrating the position assumed by the armature when the circuit is closed through the electric motor to operate the gear mechanism of the machine, and showing the locking device in position to prevent the return of the magnet armature to its normal position, Fig. 7 is a similar view, illustrating the tripping of the locking device to release the armature and allow it to return to its normal position when the crank shaft has reached a predetermined point.

In the drawing, 2 represents the base of the motor, of suitable material, preferably metal, and 3 is the casing of an electric motor, mounted on the base and supporting standards 4 and 5. These standards project upwardly from the casing of the electric motor and are preferably integral therewith. The electric motor itself has the usual fields 6 and armature 7 mounted on a shaft 8. A pinion 9 through a train of gears 10 operates a crank shaft 11 that is journaled in the standards 4 and 5. On this shaft the crank 12 for connection with the dampers or valves, is mounted, as usual in motors of this type. On one side of the electric motor casing I arrange a pair of electromagnets 13, having an armature 14 pivoted at 15 in the standards 4 and 5 and provided with an upwardly projecting arm 16. A disk 17 is mounted on the shaft 11 and is provided in its periphery with notches 18. These notches are adapted to receive the upper end of the arm 16 and allow the armature to swing upward by gravity away from the cores of the magnets 13. On the standard 5 an L-shaped locking latch 19 is pivoted having a notch 20 to receive the upper end of the arm 16 and a weight 21 for normally holding the said latch in engagement with said arm and preventing the armature from swinging upward to its normal position after the circuit has been broken through the electromagnets. The motor is thereby adapted for use either with a battery or with an alternating current through a transformer. When the latter is used, the armature will be temporarily locked in its depressed position, even when the circuit is broken through the magnets, and vibration or jumping of the armature will be positively prevented and the circuit through the electric motor will remain closed until a predetermined point is reached in the operation of the motor.

Pins 22 are mounted in the disk 17 in position to engage the lever 19 and raise it to the position illustrated in Fig. 7 to release the arm 16 just before one of the notches 18 reaches a point where the said arm could drop therein and allow the return of the armature to its normal position. The disk 17 is also provided with a pin 23, mounted loosely therein, and normally projected by a spring 24 toward contact posts 25 and 25' mounted in the standard 5 and insulated therefrom.

The shaft 8 of the electric motor has a disk 26 thereon provided with shoulders 27 in position to contact with a spring 28 mounted on an arm 29 that projects inwardly from the arm 16 near its pivotal support. This spring 28 serves as a stop for the disk 26 and checks the momentum of the electric motor armature when it has reached the limit of its movement or when the crank shaft has made a half revolution. The spring 28 may be bent to adjust it properly in the path of the disk. The armature 14 is also provided with a depending arm 30 provided with a contact screw 31 that is adapted to engage a contact spring 32 carried by a binding post 33 on the base and insulated therefrom. This contact spring is preferably arched in cross section, as illustrated in Fig. 6, so that the contact screw 31 will have a sliding bearing thereon and insure a good contact under all conditions.

I prefer to provide a guard plate 32' overhanging the contact spring 32 and preventing it from bending upward and making premature contact with the screw 31. The locking of the latch will hold the contact screw 31 in engagement with the spring plate and insure an uninterrupted circuit of the alternating current therethrough when the motor is used with such a current through a transformer.

The base of the motor is provided with a binding post 34 in circuit therewith and is also provided with similar binding posts 35, 36, 37 and 38, the four latter being insulated from the base. A conductor 39 leads from the base 34 through a battery B to the post 36 and a conductor 40 leads from the post 36 to one core of the magnets, and a similar conductor 41 leads from the post 35 to the other magnet. A conductor 42 leads from the post 36 to one pole 43 of the electric motor, and a conductor 44 leads from the other pole 45 thereof to the post 33, and conductors 46 and 47 lead respectively from the posts 37 and 38 to the contact posts 25 and 25'. A binding post 48 is mounted in the base and in circuit through a conductor 49 with the circuit closing bar of a thermostatic device 50, while conductors 51 and 52 connect the contact post of the hot and cold sides of the thermostat with the posts 37 and 38. To shift the dampers without changing the thermostat, as when the operator desires to put fuel in the heating apparatus, I provide a switch bar 53 mounted on the post 35 in position to make contact with the binding post 48, but normally insulated from the posts 37 and 38 and the base of the machine by insulating plates 54, between which the free end of the switch bar is adapted to slide.

I prefer to provide a curved slot 55 in the base, through which a finger grip on the switch bar projects in position for convenient operation. Each of the binding posts 37 and 38 is provided with a spring contact plate 56 adapted to close the circuit through the switch bar when it is moved to the right or left to start the motor and shift the dampers. Normally, the switch bar will be in its central neutral position, as shown in Fig. 5, and when so adjusted, the circuit will be closed only through the thermostat.

The operation of the motor is as follows: Assuming that the thermostat has closed the circuit through the conductors 49 and 52, the electromagnets will be energized to attract the armature 15, and the arm 16 will be disengaged from one of the notches 18 in the disk 17 and the spring 28 raised out of engagement with the disk 26 and at the same time the notched end of the latch 19 will engage the upper end of the arm 16 and hold it in its tilted position. When the armature is tilted by the energizing of the magnets, the contact screw 31 will engage the contact spring 32, closing the circuit through the electric motor and starting the motor. As soon as the disk 17 begins its half revolution, the contact pin 23 will pass out of engagement with one of the posts 25 and 25' and the electromagnet circuit through the thermostat will be instantly broken, but the armature 14 being locked by the lever 19, will remain in its tilted position, closing the circuit through the spring 32 until the disk 17 has nearly completed its half revolution, when one of the pins 22 will engage the latch 19 and tilt it from its locking position, allowing the arm 16 to ride upon the periphery of the disk 17 and drop into one of the notches 18 therein just as the half revolution is completed. The return of the armature to its normal position will raise the contact screw 31 and break the circuit through the electric motor and stop the machine. When the armature returns to its normal position, the arm 29 will drop down and the spring 28 engaging the disk 26 will positively check the momentum of the electric motor and armature.

It will be noted from the foregoing description that when the armature is energized by the closing of the circuit through the thermostat, that the contact screw of the electric motor circuit will be moved into engagement with the contact spring 32 and be locked in such position, thereby adapting the device for use with an alternating current, and the sliding contact of the screw with the plate 32' will have the effect of keeping the surface clean and insuring a good connection. Furthermore, the plate or housing, partially covering the spring and insulated from the base, will prevent any possibility of the contact spring becoming bent and prematurely engaging the contact screw before the armature is energized.

In various ways the details of construction herein shown and described may be modified and still be within the scope of my invention.

I claim as my invention:—

1. The combination, with a crank shaft, of an electric motor geared thereto and having an electric circuit, electromagnets and a thermostatic circuit therefor, an armature for said magnets, a circuit closer for said electric motor circuit carried by said armature for closing said electric motor circuit when said armature is attracted, and means for locking said armature in its attracted position for a predetermined movement of said shaft, and means for breaking the circuit through said magnets upon the initial movement of said motor.

2. The combination, with a crank shaft and crank arms, of an electric motor geared to said shaft and having an electric circuit, electromagnets and a thermostatic circuit therefor, an armature for said magnets, a circuit closer for said electric motor circuit actuated by said armature for closing said electric motor circuit when said armature is attracted, means for locking said armature in its attracted position for predetermined movement of said shaft, and a circuit breaker mounted to break the circuit through said magnets and release said armature upon the initial movement of said motor.

3. The combination, with a suitable base, of an electric motor mounted thereon, a crank shaft mounted on the frame of said motor and having crank arms, a gearing between said motor and said crank shaft, an electric circuit for said motor, electromagnets and a thermostatic circuit therefor, an armature for said magnets, a circuit closer for closing said electric motor circuit when said armature is attracted, means for locking said armature in its attracted position for a predetermined movement of said shaft, and means for breaking the circuit through said magnets after the initial movement of said motor.

4. The combination, with a crank shaft, of an electric motor geared thereto and having an electric circuit, electromagnets, a thermostatic circuit therefor, an armature for said magnets, a circuit closer for closing said electric motor circuit when said armature is attracted by said magnets, and means for checking the movement of said electric motor when the electric motor circuit is broken by the release of said magnet armature.

5. The combination, with a crank shaft, of an electric motor geared thereto and having an electric circuit, electromagnets and a thermostatic circuit therefor, an armature for said magnets, a circuit closer for said electric motor circuit carried by said armature for closing said electric motor circuit when said armature is attracted by the energizing of said magnets, means for locking said armature in its attracted position for a predetermined movement of said shaft, and means carried by said armature for checking the movement of said electric motor armature when the electric motor circuit is broken at the end of said shaft movement.

6. The combination, with a crank shaft and an electric motor geared thereto, and having an electric circuit, of electromagnets and a thermostatic circuit therefor, an armature for said magnets, a circuit closer for said electric motor circuit carried by said armature, a disk having shoulders thereon connected with the armature of said electric motor, an arm mounted on said magnet armature in position to contact with a shoulder on said disk and check the movement of said electric motor armature, a circuit closer for said electric motor circuit carried by said magnet armature, and means for locking said magnet armature in its attracted position for a predetermined movement of said shaft.

7. The combination, with a crank shaft, of a thermostatic circuit and contact studs for said circuit adjacent to said shaft, a disk mounted to revolve with said shaft, electromagnets in said thermostatic circuit, an armature therefor having an arm to engage said disk, a latch mounted to engage said arm and lock said armature in its attracted position, a circuit breaking device comprising a spring-pressed pin mounted in said disk and contacting alternately with said contact studs to make and break said thermostatic circuit, and means carried by said disk for tripping said magnet armature after a predetermined movement of said shaft.

8. The combination, with a crank shaft, of a thermostatic circuit, and contact studs for said circuit, a disk mounted to revolve with said shaft, electromagnets in said thermostatic circuit and an armature therefor, a circuit breaking device comprising a spring-pressed pin mounted in said disk and contacting alternately with said contact studs to make and break said thermostatic circuit, and means for tripping said magnet armature at a predetermined point in the movement on said disk.

9. The combination, with a base, of an electric motor mounted thereon and having a shaft and a notched disk secured on said shaft, an electric circuit for said motor, a crank shaft mounted on said motor frame and geared to said motor, electromagnets and a thermostatic circuit therefor, an armature for said magnets, a circuit closer for closing said electric motor circuit when said armature is attracted, means for locking said armature in its attracted position for a predetermined movement of said shaft, and means carried by said armature for engaging said notched disk for checking the movement of said electric motor at the end of the movement of said shaft.

In witness whereof, I have hereunto set my hand this 21st day of October, 1914.

FREDERICK S. DENISON.

Witnesses:
EDWARD A. PAUL,
C. H. REHFUSS.